US011710222B2

(12) United States Patent
Marc et al.

(10) Patent No.: US 11,710,222 B2
(45) Date of Patent: *Jul. 25, 2023

(54) SYSTEMS AND METHODS FOR GENERATING PANNING IMAGES

(71) Applicant: GoPro, Inc., San Mateo, CA (US)

(72) Inventors: Gladys Jocelyne Marc, Paris (FR); Balthazar Neveu, Issy les Moulineaux (FR); Nicolas Rahmouni, Paris (FR); Maeva Escoulan, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,524

(22) Filed: Oct. 21, 2021

(65) Prior Publication Data

US 2022/0044376 A1  Feb. 10, 2022

Related U.S. Application Data

(63) Continuation of application No. 16/840,829, filed on Apr. 6, 2020, now Pat. No. 11,164,299.

(51) Int. Cl.
*G06T 5/00* (2006.01)
*G06T 5/50* (2006.01)
*G06T 7/20* (2017.01)

(52) U.S. Cl.
CPC ............ *G06T 5/50* (2013.01); *G06T 5/002* (2013.01); *G06T 7/20* (2013.01); *G06T 2200/24* (2013.01); *G06T 2207/20221* (2013.01)

(58) Field of Classification Search
CPC .. G06T 5/50; G06T 5/002; G06T 7/20; G06T 2200/24; G06T 2207/20221; G06T 2207/10016; G06T 2207/20201; G06T 2207/30196; G06T 2207/30221; G06T 5/003; G06T 3/4038; G06T 2207/10052; G06T 15/20; G06T 7/215; G08B 13/19604; G08B 13/19608; H04N 5/23238; H04N 5/2258; H04N 5/23229; H04N 5/23248; H04N 5/23261; H04N 5/23277; H04N 5/145; H04N 5/23264; H04N 2101/00; H04N 19/51; H04N 19/527; H04N 5/272
See application file for complete search history.

(56) References Cited

U.S. PATENT DOCUMENTS

2005/0185058 A1 * 8/2005 Sablak .................. H04N 23/68
348/208.99
2005/0280707 A1 * 12/2005 Sablak ............... H04N 23/6811
348/E5.046
(Continued)

*Primary Examiner* — Jose L Couso
(74) *Attorney, Agent, or Firm* — Esplin & Associates, PC

(57) ABSTRACT

Images may be captured by a moving image capture device. A reference image and a background image may be selected from the images. The reference image may include depiction of an object, with the object blocking view of the background. The background image may include depiction of the background blocked by the object in the reference image. An object layer may be generated by segmenting the depiction of the object from the reference image. A background layer may be generated by combining the depiction of the background in the background image with the reference image. The background layer may be blurred and combined with the object layer to generate a panning image.

20 Claims, 10 Drawing Sheets

(56) References Cited

U.S. PATENT DOCUMENTS

| | | | |
|---|---|---|---|
| 2006/0062296 A1 | 3/2006 | Li | |
| 2009/0231447 A1 | 9/2009 | Paik | |
| 2011/0141225 A1 | 6/2011 | Stec | |
| 2011/0141226 A1 | 6/2011 | Stec | |
| 2012/0098927 A1 | 4/2012 | Sablak | |
| 2015/0003676 A1* | 1/2015 | Kuchiki | G06T 7/254 |
| | | | 382/103 |
| 2015/0163406 A1 | 6/2015 | Laroia | |
| 2016/0071238 A1 | 3/2016 | Kimura | |
| 2016/0277679 A1* | 9/2016 | Kimura | H04N 23/661 |
| 2016/0301868 A1* | 10/2016 | Acharya | H04N 23/80 |
| 2017/0126968 A1* | 5/2017 | Somanath | G06T 7/11 |
| 2017/0359511 A1* | 12/2017 | Okada | H04N 5/44504 |
| 2019/0289203 A1 | 9/2019 | Suitoh | |
| 2021/0203850 A1* | 7/2021 | Konishi | H04N 23/611 |
| 2021/0225065 A1* | 7/2021 | Holzer | H04N 13/282 |

\* cited by examiner reference image 610 background image 620 background layer 910 blurred background layer 920 panning image 1000 panning image 1100

SYSTEMS AND METHODS FOR GENERATING PANNING IMAGES

FIELD

This disclosure relates to generating panning images using images captured by a moving image capture device and image stabilization.

BACKGROUND

A panning blur effect may be created by panning a camera during capture to follow a subject. The panning blur effect provide a dramatic look for the subject by blurring the background while freezing the action on the subject. However, keeping the camera precisely directed at the subject is difficult, and the panning blur effect may also include the subject being blurred. A video may include greater visual capture of one or more scenes, objects, and/or activities than may be viewed at a time. Determining which portion(s) of the video should be presented during playback may be difficult and time consuming.

SUMMARY

This disclosure relates to generating panning images. Visual information, motion information, and/or other information may be obtained. The visual information may define visual content of images captured by an image capture device while experiencing motion. The motion information may characterize the motion experienced by the image capture device during capture of the images. A reference image may be selected from the images. The visual content of the reference image may have a first field of view of a scene including an object of interest. The visual content of the reference image may include a depiction of the object of interest located at a first extent of the first field of view. A background image may be selected from the images. The background image may be different from the reference image. The visual content of the background image may have a second field of view of the scene. The second field of view of the scene may be different from the first field of view based on the motion experienced by the image capture device between capture of the reference image and the background image.

The reference image and the background image may be stabilized based on the motion experienced by the image capture device between capture of the reference image and the background image and/or other information. The reference image and the background image may be stabilized such that overlapping portions of the first field of view and the second field of view are aligned and a second extent of the second field of view that overlaps with the first extent of the first field of view includes a depiction of background. An object layer may be generated. The object layer may include the depiction of the object of interest based on segmentation of the depiction of the object of interest from the visual content of the reference image. A background layer may be generated based on combination of the depiction of the background within the visual content of the background image with the visual content of the reference image such that the depiction of the object of interest is reduced in the background layer. The background layer may be blurred. A panning image may be generated based on combination of the object layer and the blurred background layer.

A system that generates panning images may include one or more electronic storages, one or more processors, and/or other components. An electronic storage may store visual information, information relating to visual content, information relating to image capture device, motion information, information relating to motion experienced by the image capture device, information relating to reference image, information relating to field of view of scene, information relating to object of interest, information relating to depiction of object of interest, information relating to background image, information relating to overlapping portions of fields of view of reference image and background image, information relating to depiction of background, information relating to object layer, information relating to background layer, information relating to blurring, information relating to panning image, and/or other information. In some implementations, the system may include one or more optical elements, one or more image sensors, one or more motion sensors, and/or other components.

One or more components of the system may be carried by a housing, such as a housing of an image capture device. For example, the optical element(s), the image sensor(s), and/or the motion sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate generating panning images. The machine-readable instructions may include one or more computer program components. The computer program components may include one or more of a visual information component, a motion information component, a reference image component, a background image component, an object layer component, a background layer component, a blur component, a panning image component, and/or other computer program components.

The visual information component may be configured to obtain visual information and/or other information. The visual information may define visual content of images. The images may have been captured by an image capture device while experiencing motion.

The motion information component may be configured to obtain motion information and/or other information. The motion information may characterize the motion experienced by the image capture device during capture of the images. In some implementations, the motion experienced by the image capture device may include rotation of the image capture device to follow motion of an object of interest.

The reference image component may be configured to select a reference image and/or other image from the images. The visual content of the reference image may have a first field of view of a scene including an object of interest. The visual content of the reference image may include a depiction of the object of interest located at a first extent of the first field of view.

The background image component may be configured to select a background image and/or other image from the images. The background image may be different from the reference image. The background image may include one of the images captured before or after the reference image. The visual content of the background image may have a second field of view of the scene. The second field of view of the scene may be different from the first field of view based on the motion experienced by the image capture device between capture of the reference image and the background image. The reference image and the background image may be stabilized based on the motion experienced by the image capture device between capture of the reference image and the background image and/or other information. The reference image and the background image may be stabilized such that overlapping portions of the first field of view and the second field of view are aligned. The reference image and the background image may be stabilized such that a second extent of the second field of view overlapping with the first extent of the first field of view includes a depiction of background.

The object layer component may be configured to generate an object layer and/or other layers. The object layer may be generated to include the depiction of the object of interest based on segmentation of the depiction of the object of interest from the visual content of the reference image.

The background layer component may be configured to generate a background layer and/or other layers. The background layer may be generated based on combination of the depiction of the background within the visual content of the background image with the visual content of the reference image. The background layer may be generated such that the depiction of the object of interest is reduced in the background layer.

In some implementations, the depiction of the object of interest may be reduced by merging the depiction of the background with the depiction of the object of interest. In some implementations, the depiction of the object of interest may be reduced by replacing the depiction of the object of interest with the depiction of the background.

The blur component may be configured to blur the background layer and/or other layers. In some implementations, the background layer may be blurred based on the motion experienced by the image capture device between capture of the reference image and the background image and/or other information. In some implementations, blurring of the background layer based on the motion experienced by the image capture device between capture of the reference image and the background image may include: computing one or more directional blur kernels that follow the motion experienced by the image capture device between capture of the reference image and the background image; and applying the directional blur kernel(s) to the background layer. In some implementations, strength with which the background layer is blurred may be determined based on the motion experienced by the image capture device between capture of the reference image and the background image and/or other information. In some implementations, strength and/or direction in which the background layer is blurred may adjusted based on user input and/or other information.

The panning image component may be configured to generate a panning image based on combination of the object layer, the blurred background layer, and/or other layers. In some implementations, generating the panning image based on the combination of the object layer and the blurred background layer may include: blurring edge of the depiction of the object of interest within the object layer; and blending the blurred edge of the depiction of the object of interest within the object layer with the background layer.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
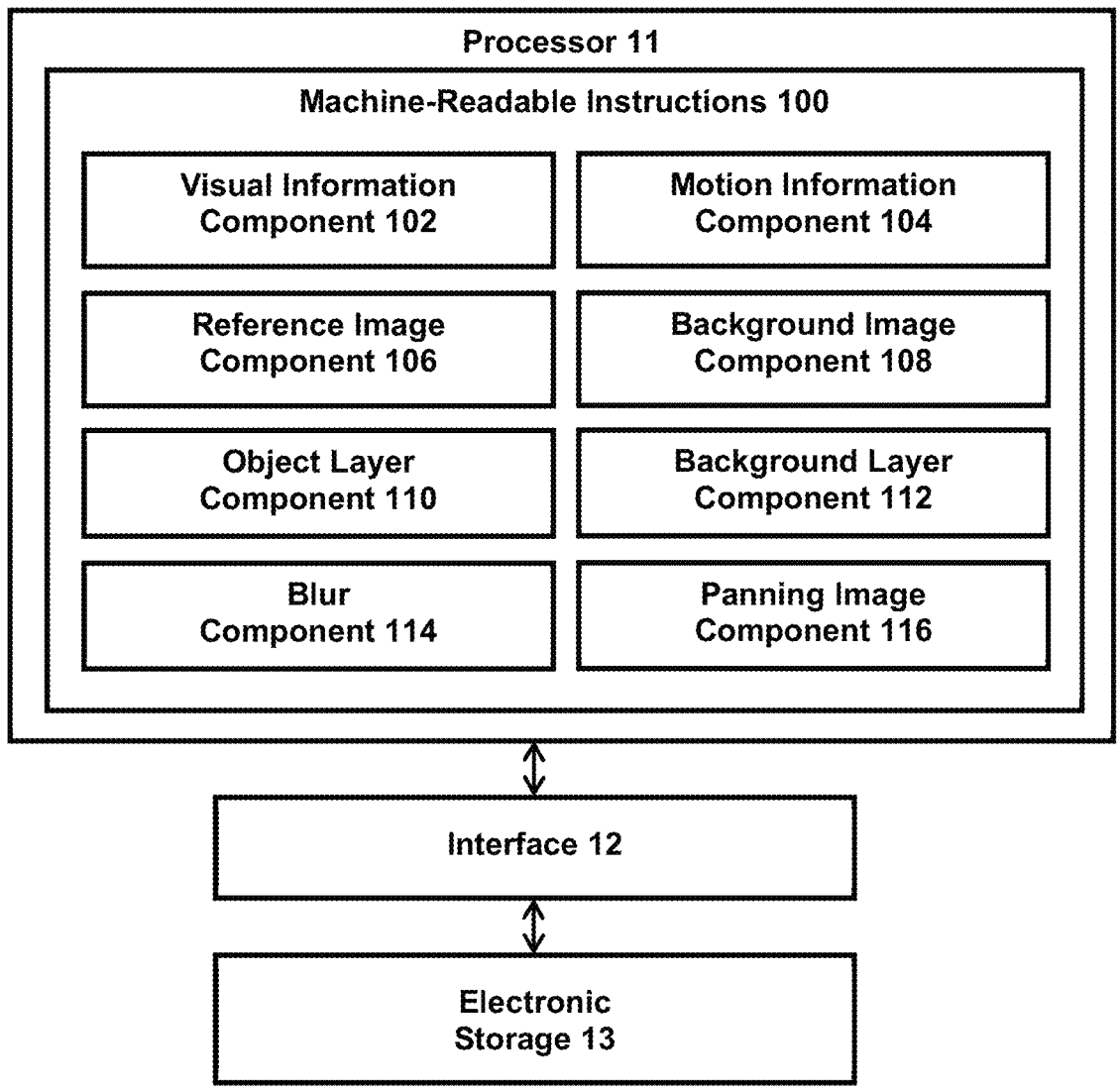
FIG. 1 illustrates an example system that generates panning images.

FIG. 1 illustrates a system 10 for generating panning images. The system 10 may include one or more of a processor 11, an interface 12 (e.g., bus, wireless interface), an electronic storage 13, and/or other components. In some implementations, the system 10 may include one or more optical elements, one or more image sensors, one or more motion sensors, and/or other components. Visual information, motion information, and/or other information may be obtained by the processor 11. The visual information may define visual content of images captured by an image capture device while experiencing motion. The motion information may characterize the motion experienced by the image capture device during capture of the images. A reference image may be selected from the images by the processor 11. The visual content of the reference image may have a first field of view of a scene including an object of interest. The visual content of the reference image may include a depiction of the object of interest located at a first extent of the first field of view. A background image may be selected from the images by the processor 11. The background image may be different from the reference image. The visual content of the background image may have a second field of view of the scene. The second field of view of the scene may be different from the first field of view based on the motion experienced by the image capture device between capture of the reference image and the background image.

The reference image and the background image may be stabilized based on the motion experienced by the image capture device between capture of the reference image and the background image and/or other information. The reference image and the background image may be stabilized such that overlapping portions of the first field of view and the second field of view are aligned and a second extent of the second field of view that overlaps with the first extent of the first field of view includes a depiction of background. An object layer may be generated by the processor 11. The object layer may include the depiction of the object of interest based on segmentation of the depiction of the object of interest from the visual content of the reference image. A background layer may be generated by the processor 11 based on combination of the depiction of the background within the visual content of the background image with the visual content of the reference image such that the depiction of the object of interest is reduced in the background layer. The background layer may be blurred by the processor 11. A panning image may be generated by the processor 11 based on combination of the object layer and the blurred background layer.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to image capture device, motion information, information relating to motion experienced by the image capture device, information relating to reference image, information relating to field of view of scene, information relating to object of interest, information relating to depiction of object of interest, information relating to background image, information relating to overlapping portions of fields of view of reference image and background image, information relating to depiction of background, information relating to object layer, information relating to background layer, information relating to blurring, information relating to panning image, and/or other information Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or motion sensor(s) of the system 10 may be carried by the housing of the image capture device. The housing may carry other components, such as the processor 11 and/or the electronic storage 13. References to a housing of an image capture device may refer to the image capture device, and vice versa.

Figure 3:
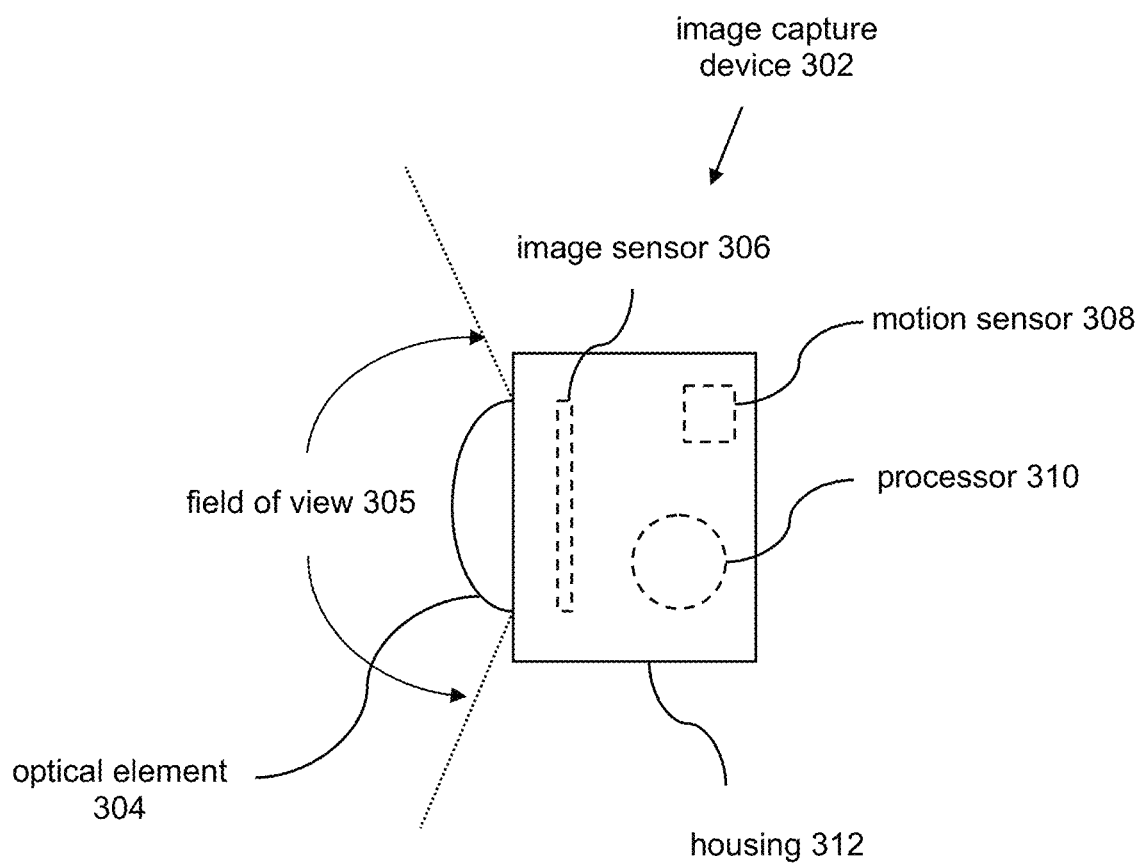
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a motion sensor 308, a processor 310, and/or other components.

One or more components of the image capture device 302 may be the same as, be similar to, and/or correspond to one or more components of the system 10. For example, the processor 308 may be the same as, be similar to, and/or correspond to the processor 11. The housing may carry other components, such as the electronic storage 13. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The motion sensor 308 may include sensor(s) that measures experienced positions and/or motions. Positions may include rotational positions (orientations) and/or translational positions. Motions may include rotational motions (changes in orientation, tilt, pitch, roll) and/or translational motions (e.g., forward/backward motion, left/right motion, up/down motion). The motion sensor 308 may convert experienced positions and/or motions into output signals. The output signals may include electrical signals. For example, the motion sensor 308 may refer to a set of motion sensors, which may include one or more inertial measurement units, one or more accelerometers, one or more gyroscopes, and/or other motion sensors. The motion sensor 308 may generate output signals conveying information that characterizes positions and/or motions of the motion sensor 308 and/or device(s) carrying the motion sensor 308, such as the image capture device 302 and/or the housing 312.

For example, the motion sensor 308 may be configured to generate a motion output signal based on positions/motion of the image capture device 302 during the capture duration. The motion output signal may convey motion information that characterizes motion experienced by the image capture device 302 at different moments (points in time, time durations) within the capture duration. For example, the motion information that characterizes motion experienced by the image capture device 302 during capture of images by the image capture device 302.

The motion information may characterize motion experienced by the image capture device 302 based on specific translational and/or rotational positions of the image capture device 302 and/or based on changes in translational and/or rotational positions of the image capture device 302 as a function of progress through the capture duration. That is, the motion information may characterize translational and/or rotational positions of the image capture device 302 and/or changes in translational and/or rotational positions of the image capture device 302 (e.g., direction, amount, velocity, acceleration) during the capture duration. The motion information may include rotational motion information characterizing rotational motion of the image capture device 302, translational motion information characterizing translational motion of the image capture device 302, and/or other motion information.

In some implementations, the motion information may include data from the motion sensor (e.g., gyroscope data, accelerometer data) with time stamps per visual content capture at different moments. For example, the motion information may include gyroscope data and/or accelerometer data per individual images/video frames captured by the image capture device. In some implementations, calibration of an inertial measurement unit may be used to combine different data within the motion information.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the motion sensor 308, and/or facilitate transfer of information from the image sensor 306 and/or the motion sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

Figure 4:
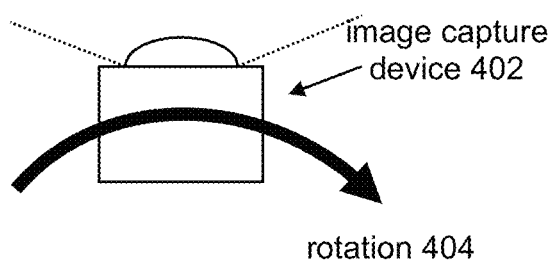
FIG. 4 illustrates example motion of an image capture device.

The image capture device 302 may capture visual content of images while experiencing motion. FIG. 4 illustrates example motion of an image capture device 402. For example, the image capture device 402 may experience rotation 404 during while it is capturing visual content of a panning image. The image capture device 402 may be rotated during an exposure of the image sensor to capture the visual content of the panning image. The image capture device 402 may be rotated to keep the subject of the panning image centered within the field of view of the image sensor. Such rotation of the image capture device 402 while exposing the image sensor to light may generate an image that blurs the background.

Figure 5:
FIG. 5 illustrates an example panning image.

However, change in posture of the subject during the exposure and/or imprecise tracking of the subject with the image capture device 402 may result in blurring of the subject. For example, FIG. 5 illustrates an example panning image 500 captured by rotating an image capture device during exposure of the image sensor. The panning image 500 may include depiction of a person moving from right to left. The image capture device may have been rotated during exposure of the image sensor to track the person's movement and capture the panning image 500 with blurred background. However, the person's posture may have changed during the exposure and/or the tracking of the person may have been imprecise, resulting in the person being blurred within the panning image 500.

Instead of generating a panning image from visual content captured by a moving image capture device in a single exposure duration, a panning image may be generated by using multiple images (captured using shorter exposure duration to reduce/eliminate motion blur) captured during the motion of the image capture device. For example, the image capture device may be used to capture visual content of multiple images while the image capture device is experiencing motion (e.g., rotational motion to track a subject). One of the captured images may be selected as a reference image, and another one of the captured images may be selected as a background image. The reference image and the background image may be stabilized based on the motion of the image capture device. A particular extent of the reference image may depict an object of interest. The same extent of the background image may depict the background (e.g., scene). An object layer may be generated by segmenting the depiction of the object from the reference image. A background layer may be generated by using the depiction of the background within the background image to reduce the depiction of the object of interest within the background layer. The background layer may be blurred, and a panning image may be generated by combining the object layer with the blurred background layer. Such generation of the panning image may be performed by the image capture device and/or a computing device remote from the image capture device (e.g., during post processing).

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating panning images. The machine-readable instructions 100 may include one or more computer program components. The machine-readable instructions 100 may include one or more of a visual information component 102, a motion information component 104, a reference image component 106, a background image component 108, an object layer component 110, a background layer component 112, a blur component 114, a panning image component 116, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain information from one or more hardware components (e.g., an image sensor) and/or one or more software components (e.g., software running on a computing device).

Visual information may be obtained during capture of the visual content and/or after acquisition of the visual content by an image capture device/image sensor. For example, the visual information component 102 may obtain visual information defining visual content while/as the visual content is captured by an image capture device. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video editing application, video player application), and/or other information. For example, a user interface/application may provide option(s) for a user to select visual content from which a panning image is to be generated. The visual information defining the visual content may be obtained based on the user's selection of the visual content through the user interface/video application. Other selections of visual content for retrieval of visual information are contemplated.

The visual information may define visual content of multiple images. The multiple images may have been captured by an image capture device while experiencing motion. The multiple images may have been captured by an image capture device from different translational positions and/or different rotational positions. For example, the visual information may define visual content of separate images captured by the image capture device 402 while undergoing rotation 404, as shown in FIG. 4. As another example, the visual information may define visual content of separate images captured by the image capture device 402 while being held by shaky hand(s).

The motion information component 104 may be configured to obtain motion information and/or other information. Obtaining motion information may include one or more of accessing, acquiring, analyzing, determining, examining, identifying, loading, locating, opening, receiving, retrieving, reviewing, selecting, storing, and/or otherwise obtaining the motion information. The motion information component 104 may obtain motion information from one or more locations. For example, the motion information component 104 may obtain motion information from a storage location, such as the electronic storage 13, electronic storage of information and/or signals generated by one or more sensors, electronic storage of a device accessible via a network, and/or other locations. The motion information component 104 may obtain motion information from one or more hardware components (e.g., a motion sensor, a hardware component of an image capture device) and/or one or more software components (e.g., software running on a computing device).

The motion information component 102 may be configured to obtain motion information of the image capture device during acquisition of the images and/or after acquisition of images by the image capture device. For example, the motion information component 104 may obtain motion information of the image capture device while images are being captured. The motion information component 104 may obtain motion information of the image capture device after images have been captured and stored in memory (e.g., the electronic storage 13). For example, the motion information may be captured and stored by one or more motion sensors, and may be obtained by the motion information component 104 when panning image is to be generated.

The motion information may characterize the motion experienced by the image capture device during capture of the images. The motion experienced by the image capture device may include translational motion and/or rotational motion. For example, the motion experienced by the image capture device during capture of images may include rotation of the image capture device to follow the motion of an object of interest. For example, the motion information may characterize the rotation 404 experienced by the image capture device 402 during capture of images, as shown in FIG. 4. The image capture device 402 may have been rotated to track the motion of an object of interest. For instance, the image capture device 402 may have been rotated to keep the of interest centered within the field of view of the image capture device 402. As another example, the motion information may characterize rotation experienced by the image capture device due to shaking of hand(s) holding the image capture device.

Motion of an image capture device may refer to how the image capture device moves/changes in position rotationally and/or translationally. For example, rotational motion of an image capture device may refer to how the image capture device is oriented/rotated around one or more axis or one or more point, such as a center point. For instance, rotational motion of an image capture device may refer to how the image capture device is rotated about one or more of yaw axis, pitch axis, and/or roll axis. Motion information of an image capture device may characterize how the image capture device is rotated (e.g., amount of rotations about the yaw, pitch, and/or roll axis) and/or is being rotated (e.g., speed and/or direction of rotations) at different moments within the capture duration. In some implementation, the motion of the image capture device may include intentional motion to track an object within the field of view of the image capture device. In some implementation, motion of the image capture device may include unintentional motion of the image capture device (e.g., motion due to shaky hand(s) holding the image capture device).

Different positions (e.g., translational position, rotational position) of the image capture device during capture of multiple images may result in the visual content of images depicting different views of the scene. Different positions (e.g., translational position, rotational position) of the image capture device during capture of multiple images may result in the visual content of images depicting different parts of the scene. For example, rotation of the image capture device during capture of multiple images may result in different images including depiction of different portions of the scene (e.g., background). Movement of the object of interest during capture of the image may result in the object of interest blocking different portions of the scene within different images.

The reference image component 106 may be configured to select a reference image and/or other image from the images. In some implementations, the reference image may be selected based on analysis of the images, information associated with the images (e.g., metadata), and/or other information. For example, the visual content of the images may be analyzed to identify the image that includes a particular depiction of the object of interest. An object of interest may refer to a living or non-living thing that is of interest to a user. An object of interest may refer to a thing that is to be the subject of the panning image. For example, an image may be selected as a reference image based on the image depicting the object in a particular action (e.g., jumping, falling), the image depicting the object in a particular posture, the image depicting the object showing particular emotion, the image depicting the object with certain amount of clarity (e.g., no motion blur), and/or based on other type of depiction of the object within the image.

In some implementations, the reference image may be selected based on user selection, and/or other information. For example, the images may be presented to a user within a graphical user interface, and the user may interact with the graphical user interface to select an image to be used as the reference image. Other selections of reference image are contemplated.

Figure 6:
FIG. 6 illustrates an example reference image and an example background image.
Figure 6:

The visual content of the reference image may have a field of view of a scene including an object of interest. The visual content of the reference image may include a depiction of the object of interest located at a particular extent of the field of view. For example, FIG. 6 illustrates an example reference image 610. The reference image 610 may include depiction of a field of view of a scene including the ground, buildings, and a person on a skateboard. The object of interest may be the person on the skateboard. The visual content of the reference image 610 may include the depiction of the person on the skateboard at a center extent of the field of view.

The background image component 108 may be configured to select a background image and/or other image from the images. The background image may be different from the reference image. That is, the background image component 108 may select one of the images not selected as the reference image as the background image. The background image may include one of the images captured before or after the reference image.

In some implementations, the background image may be selected based on analysis of the images, information associated with the images (e.g., metadata), and/or other information. For example, the visual content of the images may be analyzed to identify the image that includes different depiction of the object of interest and/or different depiction of the background from the reference image. For instance, an image may be selected as a background image based on the image depicting a portion of the scene that was covered by the object of interest in the reference image. That is, the reference image may include a depiction of the object of interest blocking the view of a particular portion of the scene/background. An image may be selected as the background image based on the image including depiction of the portion of the scene/background that was blocked by the object of interest in the reference image.

In some implementations, the background image may be selected based on user selection, and/or other information. For example, the images may be presented to a user within a graphical user interface, and the user may interact with the graphical user interface to select an image to be used as the background image. Other selections of background image are contemplated.

The visual content of the background image may have a field of view of the scene. The field of view of the scene within the background image may be different from the field of view of the scene within the reference image. The reference image and the background image may include different field of view of the scene based on the motion experienced by the image capture device between capture of the reference image and the background image. For example, based on the image capture device being rotated from left to right between capture of the reference image and the background image, the reference image and the background image may depict different portions of the scene.

The reference image and the background image may be stabilized based on the motion experienced by the image capture device between capture of the reference image and the background image and/or other information. Stabilization of the reference image and the background image may include alignment of the reference image and the background image so that the portions of the images depicting the same portion of the scene are aligned. Stabilization of the reference image and the background image may include alignment of the reference image and the background image so that the reference image and the background image appear to have been captured from the same position (without motion between capture of the reference image and the background image).

In some implementations, stabilization of the reference image and the background image may be performed based on punchout of the reference image and the background image. Rather than using the entire visual content captured by the image capture device, one or more portions of the visual content may be punched out (using a viewing window) to provide stabilization. Stabilization of visual content of the reference image and the background image may be performed based on placement of the viewing window within the field of views of the captured visual content. Stabilization of visual content may include using smaller spatial extents of the captured visual content to provide a punchout view of the visual content that creates a more stable view than when viewing the entirety of the captured visual content.

A punchout of the visual content may refer to an output of one or more portions of the visual content. A punchout of the visual content may refer to extents of the visual content that is obtained for viewing and/or extraction. The extents of the visual content viewable/extracted within the viewing window may be used to provide views of different spatial extents of the visual content. Inclusion of the extent(s) of the visual content within the punchout/viewing window may effectuate stabilization of the visual content via selective cropping.

Figure 7:
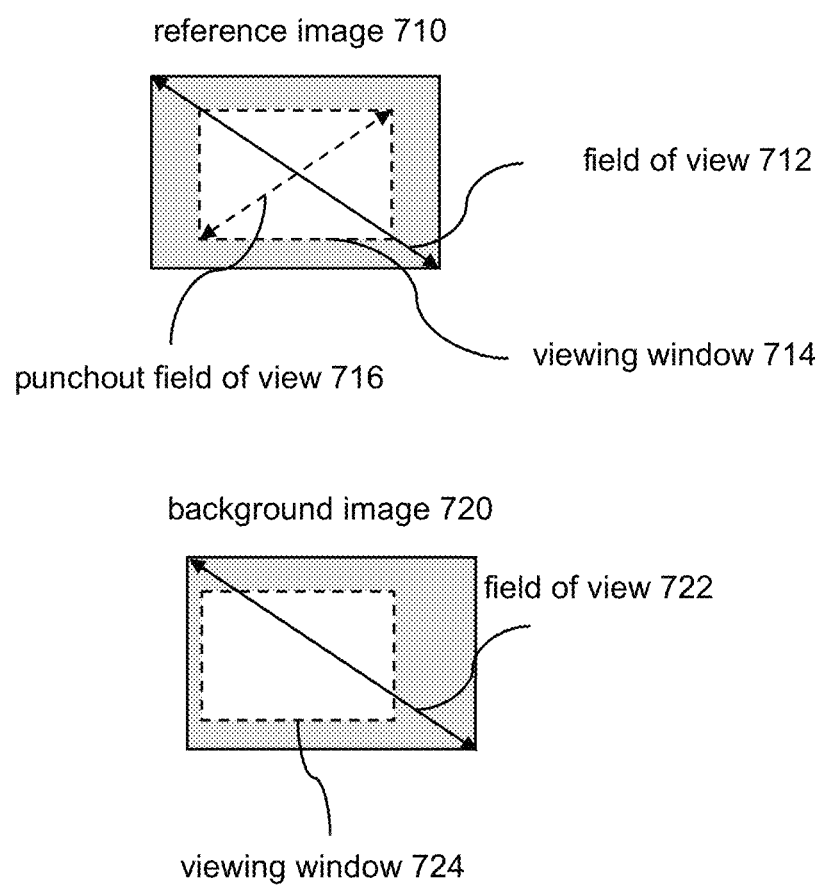
FIG. 7 illustrates example placement of viewing window for stabilization.

FIG. 7 illustrates example placement of viewing window for stabilization. A reference image 710 may have a field of view 712, and a background image 720 may have a field of view 722. A viewing window 714, having a punchout field of view 716, may be placed within the field of view 712 of the reference image. A viewing window 724 (having the same field of view as the viewing window 714) may be placed within the field of view 722 of the background image. The viewing windows 714, 724 may provide a punchout of the images 710, 720 to be used for stabilization. Placements of the viewing window 714, 724 within the fields of view 712, 722 may be changed to perform stabilization. For example, the viewing window 714 may be placed in the center of the field of view 712 of the reference image 710. The viewing window 724 may be laterally moved with respect to the field of view 722 of the background image 720. The placements of the viewing window 714, 724 may be determined based on the motion of the image capture device between capture of the reference image 710 and the background image 720. The placements of the viewing window 714, 724 may be determined based on the positions of the image capture device when the images 710, 720 were captured.

The placements of the viewing windows 714, 724 may provide punchouts of the images 710, 720 that are stable with respect to each other. For example, the field of view 712 and the field of view 722 may cover different portions of the scene due to motion (e.g., panning, shaking) of the image capture device. The punchouts of the images 710, 720 using the viewing windows 714, 724 depict the same portion of the scene. The punchouts of the images 710, 720 using the viewing windows 714, 724 may include overlapping portions of the field of view 712, 722.

The reference image and the background image may be stabilized such that overlapping portions of the fields of view of the two images are aligned. The alignment of the overlapping portions may result in pixels depicting the same portion of the scene within the reference image and the background image being aligned. For example, the reference image 610 and a background image 620 in FIG. 6 may have been stabilized such that overlapping portions of the fields of view of the two images are aligned. The reference image 610 and the background image 620 may include punchout of overlapping portions of the captured visual content, so that the images appear to have been captured by a static image capture device.

The reference image and the background image may be stabilized such that the extent of the field of view of the background image that overlaps with the extent of the field of view of the reference image depicting the object of interest includes depiction of background (rather than the object of interest). That is, the stabilized reference image may include depiction of the object of interest blocking the view of a particular portion of the scene/background, and the stabilized background image may include depiction of the portion of the scene/background that was blocked by the object of interest in the stabilized reference image.

For example, referring to FIG. 6, the reference image 610 and the background image 620 may be stabilized such that the extent of the field of view of the background image 620 that overlaps with the extent of the field of view of the reference image 610 depicting the object of interest includes depiction of background (rather than the object of interest). That is, the reference image 610 may include depiction of the person on the skateboard blocking the view of a part of light pole, building, and ground, and the background image 620 may include depiction of the part of the light pole, building, and ground that was blocked by the person on the skateboard in the reference image. The background image 620 may provide information on what was behind the object of interest in the reference image 610.

Figure 8:
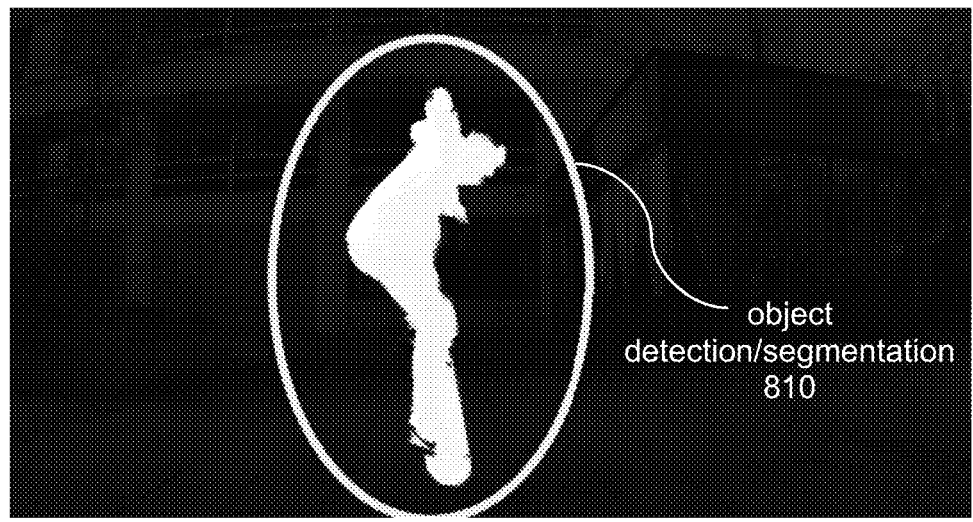
FIG. 8 illustrates an example object mask.

The object layer component 110 may be configured to generate an object layer and/or other layers. An object layer may refer to an image layer including depiction of the object of interest. The object layer may be generated to include the depiction of the object of interest based on segmentation of the depiction of the object of interest from the visual content of the reference image. For example, the object layer may be generated by segmenting the depiction of the person on the skateboard from the reference image 610. In some implementations, an object mask may be created based on segmentation of the object of interest. FIG. 8 illustrates an example object mask 800. The object mask 800 may be generated based on object detection/segmentation 810 of the object of interest from the reference image. The object mask may include one color/pixel intensity for portion of the image/layer to be masked and another color/pixel intensity for portion of the image/layer to not be masked. The object mask may be used to differentiate extents of images/layers to blur and extents of images/layers to be kept sharp. In some implementations, user input may control refinement (e.g., modification, changes) of the object mask.

The background layer component 112 may be configured to generate a background layer and/or other layers. A background layer may refer to an image layer including depiction of the background. The background layer may be generated to include the depiction of the background based on combination of the depiction of the background within the visual content of the background image with the visual content of the reference image. That is, the background layer may be generated by using the depiction of the background in both the background image and the reference image. The background layer may be generated such that the depiction of the object of interest is reduced in the background layer. Reducing the depiction of the object of interest in the background layer may include reducing the visibility and/or the presence of the depiction of the object of interest in the background layer. In some implementations, reducing the depiction of the object of interest in the background layer may include eliminating the depiction of the object of interest in the background layer.

In some implementations, the depiction of the object of interest within the background layer may be reduced by merging the depiction of the background within the background image with the depiction of the object of interest within the reference image. For example, the visual content of the background image and the visual content of the reference image may be merged so that the extent of the reference image including the depiction of the object of interest is merged with the extent of the background image including the depiction of the background. For example, the background image includes depiction of the background blocked by the object of interest in the reference image, and the portion of the background image depicting the background blocked by the object of interest in the reference image is merged with the depiction of the object of interest in the reference image to reduce the visibility of the object of interest. Depictions of the object of interest and the background may have the same or different opacity/transparency.

Figure 9:
FIG. 9 illustrates an example background layer and an example blurred background layer.
Figure 9:

For example, FIG. 9 illustrates an example background layer 910. The background layer 910 may be generated to include the depiction of the background based on combination of the depiction of the background within the visual content of the background image 620 with the visual content of the reference image 610. For example, the visual content of the background image 620 and the visual content of the reference image 610 may be merged so that the extent of the reference image 610 including the depiction of the person on the skateboard is merged with extent of the background image 620 including the depiction of the part of the light pole, building, and ground that was blocked by the person on the skateboard in the reference image 610.

In some implementations, the depiction of the object of interest within the background layer may be reduced by replacing the depiction of the object of interest within the reference image with the depiction of the background within the background image. For example, the visual content of the background image and the visual content of the reference image may be selectively used so that the extent of the reference image including the depiction of the object of interest is replaced with the extent of the background image including the depiction of the background. For example, the background image includes depiction of the background blocked by the object of interest in the reference image, and the portion of the reference image including the depiction of the object of interest is replaced with the portion of the background image depicting the background blocked by the object of interest in the reference image to reduce the visibility of the object of interest.

In some implementations, the background layer may be generated based on one or more masks, such as an object mask (e.g., the object mask 800). The portion of the reference image not masked by the object mask may be filled with corresponding pixels from the background image to generate the background layer. For example, the object mask 800 may be used to mask depiction of background and to unmask depiction of the person on the skateboard in the reference image 610. The depiction of the person on the skateboard in the reference image 610 filled with the corresponding pixels from the background image 620 to generate the background layer 910. Other generation of background layer are contemplated.

The blur component 114 may be configured to blur the background layer and/or other layers. Blurring the background layer may include making the background layer less distinct/less sharp. FIG. 9 illustrates an example blurred background layer 920. The blurred background layer 920 may be generated by blurring the background layer 910. One or more parameters may control how and/or the extent to which the background layer is blurred. For example, the blur component 114 may utilize different types of blurring techniques to produce different types of blur effect within the background layer. The strength(s) with which the background layer is blurred may be controlled by one or more strength parameters. Blur may be applied with same strength across the entire background layer or with different strengths for different portions of the background layer. The direction(s) in which the background layer is blurred may be controlled by one or more direction parameters. Blur may be applied in the same direction across the entire background layer or in different directions for different portions of the background layer.

In some implementations, the background layer may be blurred based on the motion experienced by the image capture device between capture of the reference image and the background image and/or other information. In some implementations, the direction(s) in the background layer is blurred may be determined based on the motion experienced by the image capture device between capture of the reference image and the background image and/or other information. For example, the background layer may be blurred based on the motion experienced by the image capture device between capture of the reference image and the background image by computing one or more directional blur kernels based on the motion experienced by the image capture device between capture of the reference image and the background image. For example, the directional blur kernels may be computed to follow, oppose, or be orthogonal to the motion experienced by the image capture device between capture of the reference image and the background image. The directional blur kernel(s) may be applied to the background layer to blur the background layer. Other determination of blur direction are contemplated.

In some implementations, strength(s) with which the background layer is blurred may be determined based on the motion experienced by the image capture device between capture of the reference image and the background image and/or other information. For example, the strength(s) of the blur to be applied to the background layer may be determined based on the direction and/or speed of motion experienced by the image capture device. For example, the strength of the blur to be applied to the background layer may increase with faster speed and decrease with slower speed of the motion experienced by the image capture device between capture of the reference image and the background image and/or other information. Other determination of blur strength are contemplated.

In some implementations, strength(s) and/or direction(s) in which the background layer is blurred may adjusted based on user input and/or other information. For example, a user may interact with a graphical user interface to set/change the strength(s) and/or direction(s) to be used in blurring the background layer.

The panning image component 116 may be configured to generate a panning image based on combination of the object layer, the blurred background layer, and/or other layers. The object layer and the blurred background layer may be combined into a single panning image. In some implementation, one or both of the object layer and the blurred background layer may be modified for combination into the panning image. For example, the edge/frontier of the depiction of the object of interest within the object layer may be blurred. The blurred edge of the depiction of the object of interest within the object layer may be blended with the background layer to generate the panning image. Such combination of the object layer and the blurred background layer may make smoother transition from the depiction of the object of interest to the depiction of the background than simple combination of the object layer and the blurred background layer. Blurring the edge of the depiction of the object of interest may also enable use of less accurate segmentation for generate the object layer. That is, because the outer edges of the object of interest is blurred, inaccuracies in segmentation of the object of depiction from the reference image may not be evident in the panning image.

Figure 10:
FIG. 10 illustrates an example panning image.

FIG. 10 illustrates an example panning image 1000. The panning image 1000 may be generated based on combination of the object layer including depiction of the person on skateboard and the blurred background layer 920. The edge of the person and the skateboard may be blurred and blended with the blurred background layer 920 to generate the panning image 1000.

Figure 11:
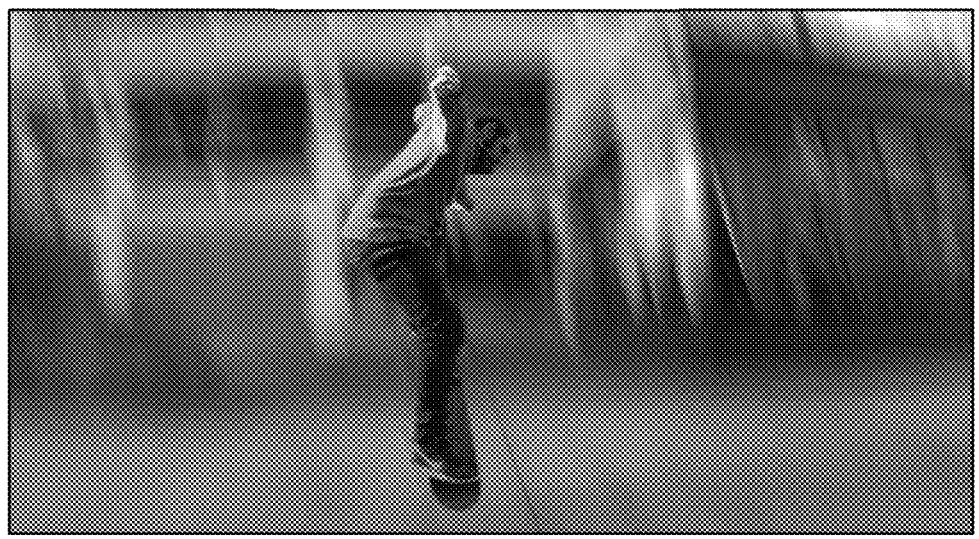
FIG. 11 illustrates an example panning image.

FIG. 11 illustrates an example panning image 1100. The panning image 1100 may be generated by using different direction of blur from the direction of blur used to generate the panning image 1000. For example, the panning image 1000 may be generated by using a lateral (left-right) directional blur for the background layer, while the panning image 1100 may be generated by using a slanted/vertical (up-down) direction blur for the background layer. For instance, the direction of the blur for the panning image 1000 may be automatically determined based on the motion experienced by the image capture device between capture of the reference image and the background image, and the direction of the blur for the panning image 1100 may be determined based on user input to set/change the direction.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
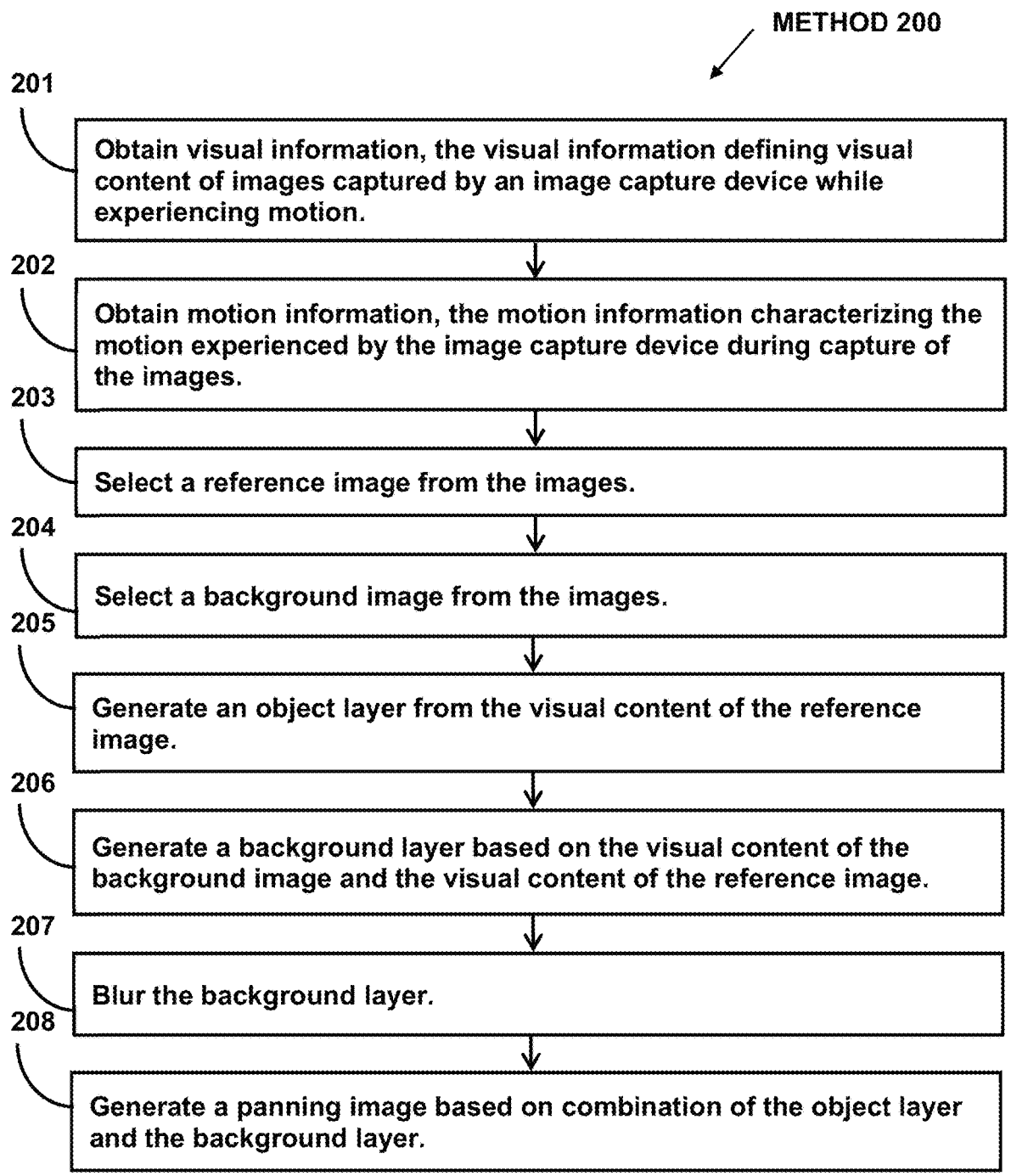
FIG. 2 illustrates an example method for generating panning images.

FIG. 2 illustrates method 200 for generating panning images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content of images captured by an image capture device while experiencing motion. In some implementation, operation 201 may be performed by a processor component the same as or similar to the visual information component 102 (Shown in FIG. 1 and described herein).

At operation 202, motion information may be obtained. The motion information may characterize the motion experienced by the image capture device during capture of the images. In some implementation, operation 202 may be performed by a processor component the same as or similar to the motion information component 104 (Shown in FIG. 1 and described herein).

At operation 203, a reference image may be selected from the images. The visual content of the reference image may have a first field of view of a scene including an object of interest. The visual content of the reference image may include a depiction of the object of interest located at a first extent of the first field of view. In some implementation, operation 203 may be performed by a processor component the same as or similar to the reference image component 106 (Shown in FIG. 1 and described herein).

At operation 204, a background image may be selected from the images. The background image may be different from the reference image. The visual content of the background image may have a second field of view of the scene. The second field of view of the scene may be different from the first field of view based on the motion experienced by the image capture device between capture of the reference image and the background image. The reference image and the background image may be stabilized based on the motion experienced by the image capture device between capture of the reference image and the background image and/or other information. The reference image and the background image may be stabilized such that overlapping portions of the first field of view and the second field of view are aligned and a second extent of the second field of view that overlaps with the first extent of the first field of view includes a depiction of background. In some implementation, operation 204 may be performed by a processor component the same as or similar to the background image component 108 (Shown in FIG. 1 and described herein).

At operation 205, an object layer may be generated. The object layer may include the depiction of the object of interest based on segmentation of the depiction of the object of interest from the visual content of the reference image. In some implementation, operation 205 may be performed by a processor component the same as or similar to the object layer component 110 (Shown in FIG. 1 and described herein).

At operation 206, a background layer may be generated based on combination of the depiction of the background within the visual content of the background image with the visual content of the reference image such that the depiction of the object of interest is reduced in the background layer. In some implementation, operation 206 may be performed by a processor component the same as or similar to the background layer component 112 (Shown in FIG. 1 and described herein).

At operation 207, the background layer may be blurred. In some implementation, operation 207 may be performed by a processor component the same as or similar to the blur component 114 (Shown in FIG. 1 and described herein).

At operation 208, a panning image may be generated based on combination of the object layer and the blurred background layer. In some implementation, operation 208 may be performed by a processor component the same as or similar to the panning image component 116 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating panning images, the system comprising:
one or more physical processors configured by machine-readable instructions to:
obtain visual information, the visual information defining visual content of images captured by an image capture device while experiencing motion;
select a reference image from the images, the visual content of the reference image having a first field of view of a scene including an object of interest;
select a background image from the images, the background image different from the reference image, the visual content of the background image having a second field of view of the scene different from the first field of view based on the motion experienced by the image capture device between capture of the reference image and the background image;
generate an object layer including a depiction of the object of interest based on segmentation of the depiction of the object of interest from the visual content of the reference image;
generate a background layer based on combination of the visual content of the background image and the visual content of the reference image, wherein the combination of the visual content of the background image and the visual content of the reference image reduces the depiction of the object of interest in the background layer; and
generate a panning image based on combination of the object layer and the background layer.

2. The system of claim 1, wherein the reference image and the background image are stabilized based on the motion experienced by the image capture device between capture of the reference image and the background image such that overlapping portions of the first field of view and the second field of view are aligned.

3. The system of claim 1, wherein the background layer is blurred before the generation of the panning image.

4. The system of claim 3, wherein the background layer is blurred based on the motion experienced by the image capture device between capture of the reference image and the background image.

5. The system of claim 4, wherein blurring of the background layer based on the motion experienced by the image capture device between capture of the reference image and the background image includes:
computing a directional blur kernel that follows the motion experienced by the image capture device between capture of the reference image and the background image; and
applying the directional blur kernel to the background layer.

6. The system of claim 5, wherein strength with which the background layer is blurred is determined based on the motion experienced by the image capture device between capture of the reference image and the background image.

7. The system of claim 3, wherein strength and direction in which the background layer is blurred is adjusted based on user input.

8. The system of claim 1, wherein the generation of the panning image based on the combination of the object layer and the background layer includes:
edge of the depiction of the object of interest within the object layer being blurred; and
the blurred edge of the depiction of the object of interest within the object layer being blended with the background layer.

9. The system of claim 1, wherein the background image includes one of the images captured before or after the reference image.

10. A method for generating panning images, the method performed by a computing system including one or more processors, the method comprising:
obtaining, by the computing system, visual information, the visual information defining visual content of images captured by an image capture device while experiencing motion;
selecting, by the computing system, a reference image from the images, the visual content of the reference image having a first field of view of a scene including an object of interest;
selecting, by the computing system, a background image from the images, the background image different from the reference image, the visual content of the background image having a second field of view of the scene different from the first field of view based on the motion experienced by the image capture device between capture of the reference image and the background image;
generating, by the computing system, an object layer including a depiction of the object of interest based on segmentation of the depiction of the object of interest from the visual content of the reference image;

generating, by the computing system, a background layer based on combination of the visual content of the background image and the visual content of the reference image, wherein the combination of the visual content of the background image and the visual content of the reference image reduces the depiction of the object of interest in the background layer; and generating, by the computing system, a panning image based on combination of the object layer and the background layer.

11. The method of claim 10, wherein the reference image and the background image are stabilized based on the motion experienced by the image capture device between capture of the reference image and the background image such that overlapping portions of the first field of view and the second field of view are aligned.

12. The method of claim 10, wherein the background layer is blurred before generating the panning image.

13. The method of claim 12, wherein the background layer is blurred based on the motion experienced by the image capture device between capture of the reference image and the background image.

14. The method of claim 13, wherein blurring of the background layer based on the motion experienced by the image capture device between capture of the reference image and the background image includes:

computing a directional blur kernel that follows the motion experienced by the image capture device between capture of the reference image and the background image; and applying the directional blur kernel to the background layer.

15. The method of claim 14, wherein strength with which the background layer is blurred is determined based on the motion experienced by the image capture device between capture of the reference image and the background image.

16. The method of claim 12, wherein strength and direction in which the background layer is blurred is adjusted based on user input.

17. The method of claim 10, wherein generating the panning image based on the combination of the object layer and the background layer includes:

blurring edge of the depiction of the object of interest within the object layer; and blending the blurred edge of the depiction of the object of interest within the object layer with the background layer.

18. The method of claim 10, wherein the background image includes one of the images captured before or after the reference image.

19. A system for generating panning images, the system comprising:

one or more physical processors configured by machine-readable instructions to:

obtain visual information, the visual information defining visual content of images captured by an image capture device while experiencing motion;

select a reference image from the images, the visual content of the reference image having a first field of view of a scene including an object of interest;

select a background image from the images, the background image different from the reference image, the visual content of the background image having a second field of view of the scene different from the first field of view based on the motion experienced by the image capture device between capture of the reference image and the background image, wherein the reference image and the background image are stabilized based on the motion experienced by the image capture device between capture of the reference image and the background image such that overlapping portions of the first field of view and the second field of view are aligned;

generate an object layer including a depiction of the object of interest based on segmentation of the depiction of the object of interest from the visual content of the reference image;

generate a background layer based on combination of the visual content of the background image and the visual content of the reference image, wherein the combination of the visual content of the background image and the visual content of the reference image reduces the depiction of the object of interest in the background layer; and generate a panning image based on combination of the object layer and the background layer.

20. The system of claim 19, wherein before the generation of the panning image, the background layer is blurred based on the motion experienced by the image capture device between capture of the reference image and the background image.

* * * * *